(Model.)

W. N. WHITELEY.
MAIN WHEEL FOR HARVESTERS.

No. 338,376. Patented Mar. 23, 1886.

2 Sheets—Sheet 1.

WITNESSES:
Wm. P. Gill
James P. Stabler

INVENTOR
William N. Whiteley
BY R. D. Smith
his ATTORNEY (Model.)

W. N. WHITELEY.
MAIN WHEEL FOR HARVESTERS.

No. 338,376. Patented Mar. 23, 1886.

WITNESSES:
Wm. P. Gill.
James P. Stabler.

INVENTOR
Wm. N. Whiteley
BY R. W. Smith
ATTORNEY

United States Patent Office.

WILLIAM N. WHITELEY, OF SPRINGFIELD, OHIO.

MAIN WHEEL FOR HARVESTERS.

SPECIFICATION forming part of Letters Patent No. 338,376, dated March 23, 1886.

Application filed May 8, 1885. Serial No. 164,783. (Model.)

*To all whom it may concern:*

Be it known that I, WILLIAM N. WHITELEY, of Springfield, in the county of Clark and State of Ohio, have invented new and useful Improvements in Main Wheels for Harvesters; and I do hereby declare that the following is a full and accurate description of the same, reference being had to the accompanying drawings, wherein—

Figure 1:
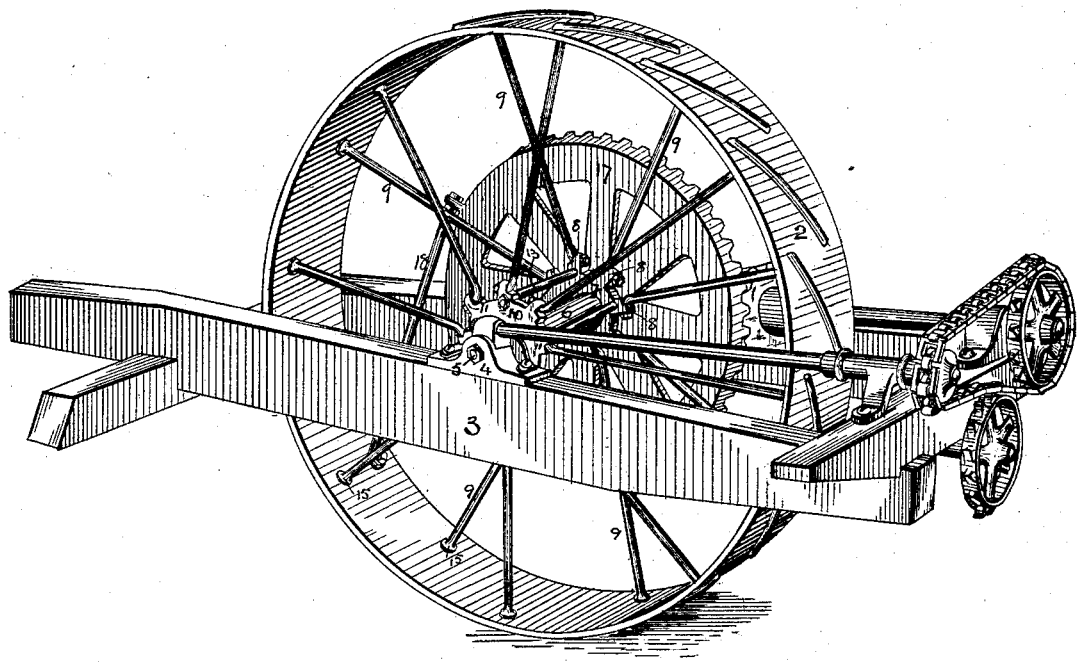
Figure 2:
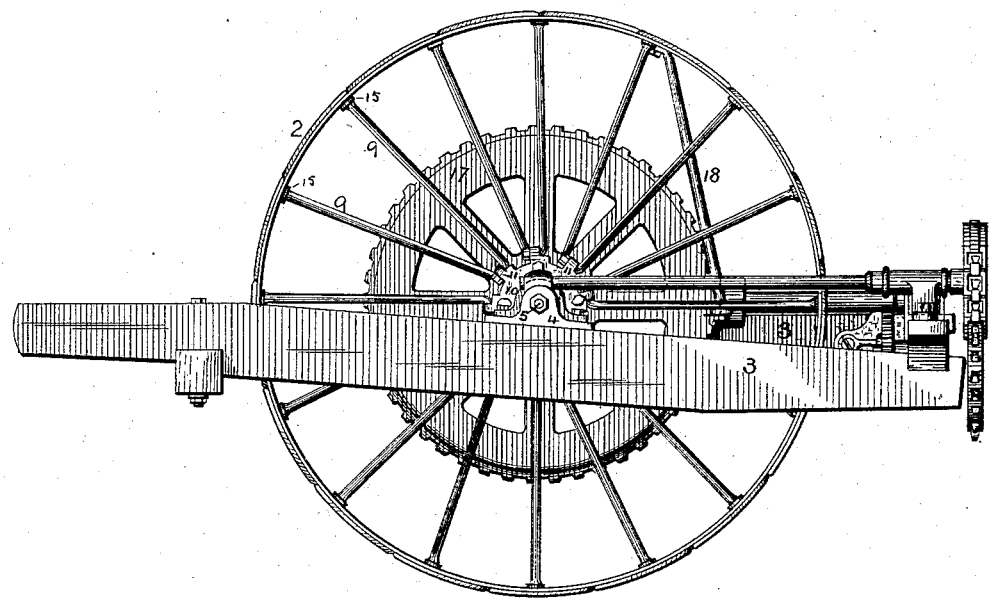
Figure 4:
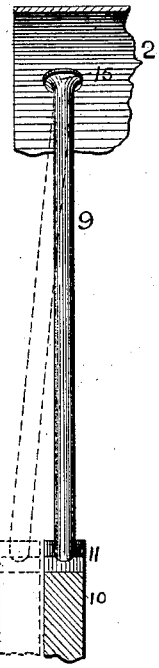
Figure 3:
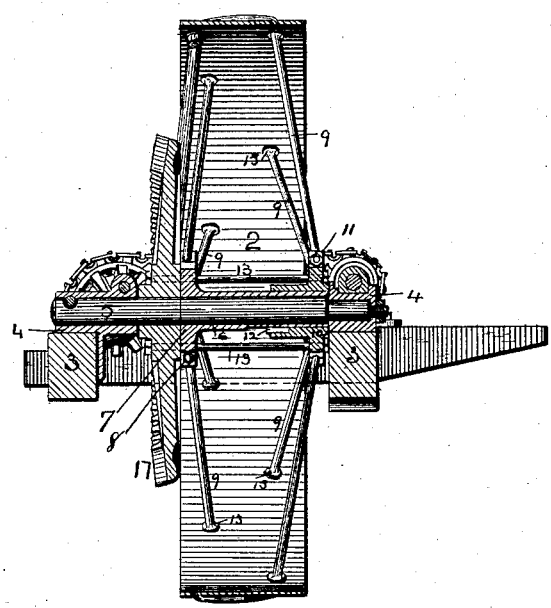
Figure 5:
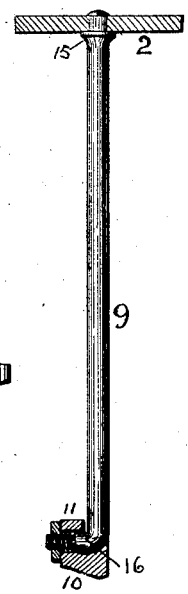

Figure 1 is a perspective view of my wheel and the main-wheel frame. Fig. 2 is a side elevation. Fig. 3 is an axial section; Figs. 4 and 5, details of a spoke.

2 is the main wheel, and 3 is the main-wheel frame, on which the bearing-boxes 4 are mounted to support the main axle 5. It is usual with wheels of this kind to make the axle stationary, and I prefer to so make it. One (or both) of the boxes 4 is therefore made to clamp the end of the axle, and this is effectively accomplished by splitting the box along one side and providing clamping-bolts to close said split and clamp the box on the surface of the axle. The hub fills the space between the two bearing-boxes and forms the bearing for the wheel. It is contractile, and is composed of a main sleeve, 6, and a sliding flanged sleeve, 10. The sleeve 6 has permanently attached a flange, 7, with a series of lugs, 8—one for each of the spokes 9 on one side of the wheel. The sleeve 10 is provided with a similar series of radial lugs, 11. The sleeve 10 is also provided with a long key or spline, 12, which prevents any rotation upon the sleeve 6. Straining-bolts 13 pass through the sleeve 6 and sleeve 10, and when their nuts are moved said sleeves are caused to approach or are permitted to recede from each other. The rim of wheel 2 is iron or steel plate, and the spokes 9 are also of iron or steel. Each spoke has near its outer end an enlargement or shoulder, 15, and the end of the spoke exterior to said shoulder is tenoned, so as to be driven through a hole in said wheel-rim and fastened on the outside. I prefer to rivet it. The inner end of each spoke is bent sidewise, as at 16, and screw-threaded. This sidewise end is fitted to pass through a hole in the lug 8 or 11 and be secured there by a screw-nut, as shown, the L-shaped ends or heads being in the direction of the plane of the wheel tangent to the axis, partly rotated in the lugs as the wheel is expanded or contracted. When the spokes are thus fastened into the wheel-rim, and are also rigidly attached to the sleeves 6 and 10, a movement of said sleeve 10 in one direction will cause an expansive strain upon the wheel-rim, and at all times it will form a positive connection between the wheel and hub, which will not only truly center the rim, but will prevent any accidental disablement of the wheel by the slipping of a spoke out of its place. The gear-ring 17 is also fitted upon the sleeve 6 exterior to the flange 7, and is secured in place by bolts which pass through said gear and through said flange, and this duty may be performed by the straining-bolts 13. The usual draft-rod, 18, is employed to prevent torsion of the wheel spokes and hub. The spokes 9 are placed in position radial as to the axis of the wheel, and with their hook ends in a plane transverse as to said axis, so that as the rim is strained the thrust of the spokes will react in the direction of said axis, and the expansive force will not be diminished by a tendency of the hub to rotate and twist.

Having described my invention, I claim—

1. In a driving or carrying wheel, a metallic rim and a hub composed of a main sleeve and a sliding flanged sleeve, 10, and straining-bolts connecting the sleeve, and combined with spokes provided at the outer ends with tenons and shoulders and secured to the wheel-rim, and the inner ends with L-heads set in sockets tangential to the axis thereof, whereby when the parts of the hub are drawn together or relaxed said L-heads will partly rotate in their sockets without cramping, substantially as set forth.

2. In a trussed driving or carrying wheel, a contractile hub composed of a main sleeve, 6, and a sliding flanged sleeve, 10, and a detachable gear-wheel, in combination with the tension-bolts 13, which pass through said gear and the flanges of the hub, as and for the purpose set forth.

3. A driving or carrying wheel rim and spokes 9, each having an L-shaped end, 16, in combination with adjustable flange 10, sleeve 6, and straining-rods 13, as shown and described, for the purposes set forth.

4. A driving or carrying wheel and draft-rod 18, combined with a gear-wheel detachable from said driving-wheel and its contractile hub, and the straining-bolts 13, whereby the gear-ring is attached and the wheel is strained by the same bolts, for the purposes set forth, substantially as shown and described.

5. In an expanding wheel, the spokes set in radial planes, or nearly so, with axis of an expanding and contracting hub, and with the hook ends in a plane transverse to the axis, for the purpose set forth.

WILLIAM N. WHITELEY.

In presence of—
SUE J. HOUCK,
F. B. FURNISS.